US 6,694,725 B2

United States Patent
Furman et al.

(10) Patent No.: US 6,694,725 B2
(45) Date of Patent: Feb. 24, 2004

(54) METHOD AND APPARATUS FOR REDUCING COMBUSTION ENGINE EMISSIONS

(75) Inventors: Anthony Holmes Furman, Scotia, NY (US); Michael Kent Cueman, Niskayuna, NY (US); Penelope Markatou, Phoenixville, PA (US)

(73) Assignee: General Electric Company, Niskayuna, NY (US)

( * ) Notice: Subject to any disclaimer, the term of this patent is extended or adjusted under 35 U.S.C. 154(b) by 2 days.

(21) Appl. No.: 10/142,343

(22) Filed: May 10, 2002

(65) Prior Publication Data

US 2003/0209007 A1 Nov. 13, 2003

(51) Int. Cl.[7] .................................................. F01N 3/00
(52) U.S. Cl. .............................. 60/275; 60/274; 60/280; 60/300; 60/303; 180/62.3; 180/62.4; 318/376; 701/22
(58) Field of Search .......................... 60/274, 275, 280, 60/281, 300, 303, 311, 286; 180/65.2, 65.3, 65.4; 318/376; 701/22

(56) References Cited

U.S. PATENT DOCUMENTS

| | | | | | |
|---|---|---|---|---|---|
| 4,774,811 | A | * | 10/1988 | Kawamura | 60/608 |
| 5,323,868 | A | * | 6/1994 | Kawashima | 180/65.4 |
| 5,881,559 | A | * | 3/1999 | Kawamura | 60/597 |
| 6,038,854 | A | * | 3/2000 | Penetrante et al. | 60/297 |
| 6,173,569 | B1 | * | 1/2001 | Kusada et al. | 60/277 |
| 6,362,535 | B1 | * | 3/2002 | Tilyou et al. | 290/40 C |
| 6,421,599 | B1 | * | 7/2002 | Lippa et al. | 701/102 |
| 6,470,985 | B1 | * | 10/2002 | Inada et al. | 180/65.3 |

* cited by examiner

Primary Examiner—Binh Tran

(57) ABSTRACT

An apparatus for reducing emissions of a combustion engine is disclosed, the apparatus comprising: an energy converter adapted to convert mechanical energy to electrical energy, but having no mechanical coupling to any drive shaft of the combustion engine; and an exhaust aftertreatment device adapted to receive the electrical energy from the energy converter, receive exhaust gases from the combustion engine, and remove pollutants from the exhaust gases.

33 Claims, 1 Drawing Sheet

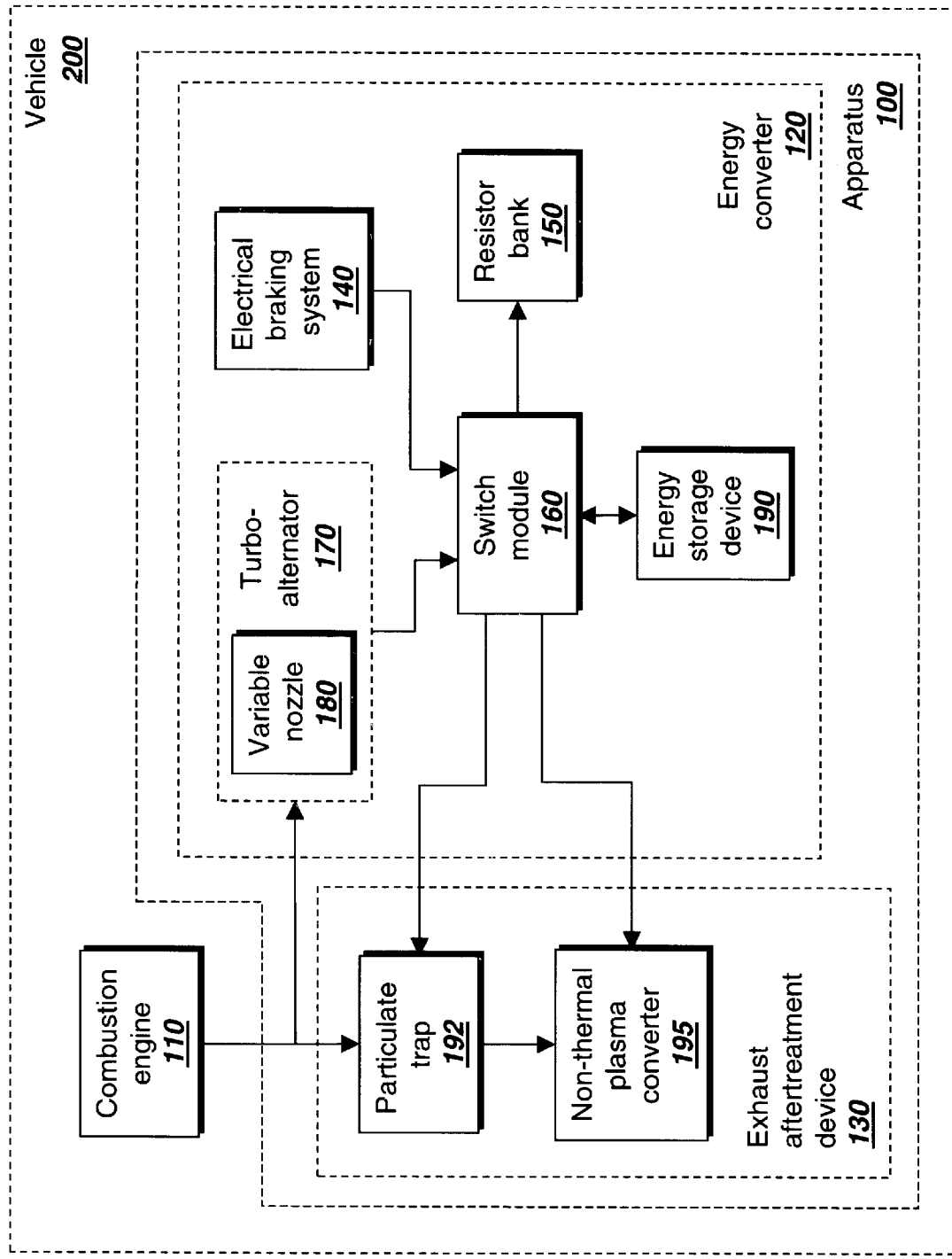

METHOD AND APPARATUS FOR REDUCING COMBUSTION ENGINE EMISSIONS

BACKGROUND

The present invention relates generally to the field of reducing pollutant emissions produced by combustion engines, and more specifically to the conversion of otherwise wasted mechanical energy to electrical energy for the operation of exhaust aftertreatment devices.

In a wide variety of applications, notably vehicular applications, aftertreatment devices are used to reduce the level of pollutants in combustion engine exhausts. Such aftertreatment devices usually require energy for operation, either continuously to support a primary mode of operation, or sporadically to support a maintenance operation. For example, a non-thermal plasma converter requires power continuously to produce a plasma arc that effects pollutant conversion; a particulate trap, in contrast, requires power only sporadically to incinerate accumulated deposits.

Conventionally, powering these aftertreatment devices often reduces the overall efficiency of the vehicle. For the non-thermal plasma converter, an alternator attached to the engine drive shaft diverts otherwise useful power to the converter. For the particulate trap, the engine may be run sporadically at an inefficient high temperature to effect deposit incineration.

In conventional vehicle operation, however, mechanical energy in various forms is temporarily stored, but then typically wasted. For example, engine exhaust energy not consumed running a turbo charger is typically ducted overboard; vehicle kinetic energy not consumed climbing hills is typically dissipated during braking. An opportunity exists, therefore, to increase overall vehicle efficiency by using otherwise wasted mechanical energy to power exhaust aftertreatment devices.

SUMMARY

The opportunity described above is addressed, in one embodiment of the present invention, by an apparatus for reducing emissions of a combustion engine, the apparatus comprising: an energy converter adapted to convert mechanical energy to electrical energy, the energy converter having no mechanical coupling to any drive shaft of the combustion engine; and an exhaust aftertreatment device adapted to receive electrical energy from the energy converter, receive exhaust gases from the combustion engine, and remove pollutants from the exhaust gases.

DRAWINGS

These and other features, aspects, and advantages of the present invention will become better understood when the following detailed description is read with reference to the accompanying drawings in which like characters represent like parts throughout the drawings, wherein:

The FIGURE illustrates a block diagram of an apparatus for reducing combustion engine emissions in accordance with one embodiment of the present invention.

DETAILED DESCRIPTION

In accordance with one embodiment of the present invention, the FIGURE illustrates a vehicle 200 comprising a combustion engine 110, an energy converter 120 and an exhaust aftertreatment device 130. Combustion engine 110 provides motive power for vehicle 200. Energy converter 120 converts mechanical energy to electrical energy, but has no mechanical coupling to any drive shaft of combustion engine 110. Aftertreatment device 130 receives the electrical energy from energy converter 120, receives exhaust gases from combustion engine 110, and removes pollutants from the exhaust gases.

Combustion engine 110 is any device for deriving mechanical or electrical energy from chemical energy stored in a fuel. Examples of combustion engine 110 include, without limitation: Otto-, Diesel-, Brayton-, Rankine-, and Stirling-cycle engines; reciprocating engines; rotary engines; pulse detonation engines; and fuel cells.

Energy converter 120 is any device for converting stored mechanical energy or flowing mechanical power to electrical energy or electrical power. Examples of energy converter 120 include, without limitation, electrical braking systems and turbo-alternators.

Aftertreatment device 130 is any electrically operated device for removing pollutants from a gas stream. Examples of aftertreatment device 130 include, without limitation, particulate traps and non-thermal plasma converters.

In accordance with a more detailed embodiment of the present invention, energy converter 120 comprises an electrical braking system 140. Electrical braking system 140 converts kinetic energy of a vehicle 200 into electrical energy.

A typical embodiment of electrical braking system 140 comprises, for example, an electrical alternator or electrical generator mechanically coupled to provide a braking torque to vehicle wheels by generating electrical power. The product of the braking torque and wheel angular speed is a mechanical power which flows to reduce mechanical energy stored as vehicle kinetic energy.

In accordance with another more detailed embodiment of the present invention, energy converter 120 comprises a turbo-alternator 170. Turbo-alternator 170 receives exhaust gases from combustion engine 110 and converts fluid mechanical energy into electrical energy.

A typical embodiment of turbo-alternator 170 comprises, for example, an axial-flow turbine disposed in the flow of exhaust gases and mechanically coupled to an electrical alternator. When electrical power is generated, a pressure drop develops across the axial-flow turbine as a function of turbine torque and turbine angular speed. The product of the pressure drop and a volume flow rate of exhaust gases is a fluid mechanical power absorbed by turbo-alternator 170 and converted into electrical power.

In accordance with another embodiment of the present invention, vehicle 200 further comprises a resistor bank 150, an energy storage device 190, and a switch module 160. In operation, resistor bank 150 dissipates electrical energy as heat; energy storage device 190 stores electrical energy; and switch module 160 controls the flow of electrical energy among energy converter 120, exhaust aftertreatment device 130, resistor bank 150, and energy storage device 190.

A typical embodiment of resistor bank 150 comprises, for example, a plurality of electrical resistors and a means of cooling the electrical resistors. Examples of such cooling means include, without limitation, fans, heat sinks, heat pipes and radiators. Examples of electrical resistors include, without limitation, carbon composition, carbon film, ceramic composition, metal alloy, metal film, metal oxide, and wirewound resistors.

Energy storage device 190 is any mechanical, electrical or electronic device, or combination thereof, capable of storing and releasing electrical energy; examples include, without limitation, re-chargeable batteries, capacitors, ultra-capacitors, inductors, magnetic storage rings, and motor driven flywheels with electrical braking.

Switch module 160 is any mechanical, electrical or electronic device, or combination thereof, capable of routing (controlling) the flow of power among the various devices coupled thereto; examples include, without limitation, mechanical switches comprising, for example, relays, contactors, or any combination thereof, and solid-state switches comprising, for example, transistors, thyristors, or any combination thereof.

In accordance with a more detailed embodiment of the present invention, turbo-alternator 170 comprises a variable nozzle 180. In operation, variable nozzle 180 modifies the flow of exhaust gases from combustion engine 110 to turbo-alternator 170 so as to match the performance of turbo-alternator 170 to the instantaneous condition of combustion engine 110. A typical embodiment of variable nozzle 180 comprises, for example, movable vanes whose positions serve to direct the exhaust gas flow and alter the flow angle of attack with respect to turbine blades of turbo-alternator 170.

In accordance with another more detailed embodiment of the present invention, exhaust aftertreatment device 130 comprises a particulate trap 192 designed to be electrically regenerated. During regeneration, electrical energy is used to clean particulate trap 192 by, for example, incinerating trapped particles.

In accordance with yet another more detailed embodiment of the present invention, exhaust aftertreatment device 130 comprises a non-thermal plasma converter 195. In operation, non-thermal plasma converter 195 uses electrical energy to establish a plasma disposed to allow exhaust gases to pass therethrough. Chemical reactions between the plasma and the exhaust gases render some pollutant species harmless.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An apparatus for reducing emissions of a combustion engine, said apparatus comprising:
   an energy converter adapted to convert mechanical energy to electrical energy, said energy converter having no mechanical coupling to any drive shaft of said combustion engine; and
   an exhaust aftertreatment device adapted to receive said electrical energy from said energy converter, receive exhaust gases from said combustion engine, and remove pollutants from said exhaust gases,
   said energy converter comprising a turbo-alternator adapted to receive said exhaust gases and convert fluid mechanical energy into electrical energy,
   said turbo-alternator comprising a variable nozzle adapted to modify a flow of said exhaust gases from said combustion engine to said turbo-alternator.

2. The apparatus of claim 1 wherein said energy converter comprises an electrical braking system adapted to convert kinetic energy of a vehicle into electrical energy.

3. The apparatus of claim 1 further comprising:
   a resistor bank adapted to dissipate said electrical energy as heat; and
   a switch module adapted to control flows of said electrical energy among said energy converter, said resistor bank, and said exhaust aftertreatment device.

4. The apparatus of claim 1 further comprising:
   an energy storage device adapted to store said electrical energy; and
   a switch module adapted to control flows of electrical energy among said energy converter, said energy storage device, and said exhaust aftertreatment device.

5. The apparatus of claim 4 further comprising a resistor bank adapted to dissipate said electrical energy as heat, wherein said switch module is further adapted to control flows of electrical energy to said resistor bank.

6. The apparatus of claim 1 wherein said exhaust aftertreatment device comprises a particulate trap, said particulate trap being adapted to be electrically regenerated.

7. The apparatus of claim 1 wherein said exhaust aftertreatment device comprises a non-thermal plasma converter.

8. An apparatus for reducing emissions of a combustion engine, said apparatus comprising:
   an energy converter adapted to convert mechanical energy to electrical energy, said energy converter having no mechanical coupling to any drive shaft of said combustion engine;
   an exhaust aftertreatment device adapted to receive said electrical energy from said energy converter, receive exhaust gases from said combustion engine, and remove pollutants from said exhaust gases;
   a resistor bank adapted to dissipate said electrical energy as heat;
   an energy storage device adapted to store said electrical energy; and
   a switch module adapted to control flows of electrical energy among said energy converter, said exhaust aftertreatment device, said resistor bank, and said energy storage device,
   said energy converter comprising a turbo-alternator adapted to receive said exhaust gases and convert fluid mechanical energy into electrical energy,
   said turbo-alternator comprising a variable nozzle adapted to modify a flow of said exhaust gases from said combustion engine to said turbo-alternator.

9. The apparatus of claim 8 wherein said energy converter comprises an electrical braking system adapted to convert kinetic energy of a vehicle into electrical energy.

10. The apparatus of claim 8 wherein said exhaust aftertreatment device comprises a particulate trap, said particulate trap being adapted to be electrically regenerated.

11. The apparatus of claim 8 wherein said exhaust aftertreatment device comprises a non-thermal plasma converter.

12. A vehicle comprising:
   a combustion engine adapted to provide motive power;
   an energy converter adapted to convert mechanical energy to electrical energy, said energy converter having no mechanical coupling to any drive shaft of said combustion engine; and
   an exhaust aftertreatment device adapted to receive said electrical energy from said energy converter, receive exhaust gases from said combustion engine, and remove pollutants from said exhaust gases,
   said energy converter comprising a turbo-alternator adapted to receive said exhaust gases and convert fluid mechanical energy into electrical energy,
   said turbo-alternator comprising a variable nozzle adapted to modify a flow of said exhaust gases from said combustion engine to said turbo-alternator.

13. The vehicle of claim 12 wherein said energy converter comprises an electrical braking system adapted to convert kinetic energy of a vehicle into electrical energy.

14. The vehicle of claim 12 further comprising:
a resistor bank adapted to dissipate said electrical energy as heat; and
a switch module adapted to control flows of said electrical energy among said energy converter, said resistor bank, and said exhaust aftertreatment device.

15. The vehicle of claim 12 further comprising:
an energy storage device adapted to store said electrical energy; and
a switch module adapted to control flows of electrical energy among said energy converter, said energy storage device, and said exhaust aftertreatment device.

16. The vehicle of claim 15 further comprising a resistor bank adapted to dissipate said electrical energy as heat, wherein said switch module is further adapted to control flows of electrical energy to said resistor bank.

17. The vehicle of claim 12 wherein said exhaust aftertreatment device comprises a particulate trap, said particulate trap being adapted to be electrically regenerated.

18. The vehicle of claim 12 wherein said exhaust aftertreatment device comprises a non-thermal plasma converter.

19. A vehicle comprising:
a combustion engine adapted to provide motive power;
an energy converter adapted to convert mechanical energy to electrical energy, said energy converter having no mechanical coupling to any drive shaft of said combustion engine;
an exhaust aftertreatment device adapted to receive said electrical energy from said energy converter, receive exhaust gases from said combustion engine, and remove pollutants from said exhaust gases;
a resistor bank adapted to dissipate said electrical energy as heat;
an energy storage device adapted to store said electrical energy; and
a switch module adapted to control flows of electrical energy among said energy converter, said exhaust aftertreatment device, said resistor bank, and said energy storage device,
said energy converter comprising a turbo-alternator adapted to receive said exhaust gases and convert fluid mechanical energy into electrical energy,
said turbo-alternator comprising a variable nozzle adapted to modify a flow of said exhaust gases from said combustion engine to said turbo-alternator.

20. The vehicle of claim 19 wherein said energy converter comprises an electrical braking system adapted to convert kinetic energy of a vehicle into electrical energy.

21. The vehicle of claim 19 wherein said exhaust aftertreatment device comprises a particulate trap, said particulate trap being adapted to be electrically regenerated.

22. The vehicle of claim 19 wherein said exhaust aftertreatment device comprises a non-thermal plasma converter.

23. A method for reducing emissions of a combustion engine, said method comprising:
converting mechanical energy to electrical energy without mechanically coupling to any drive shaft of said combustion engine; and
removing pollutants from exhaust gases of said combustion engine using said electrical energy,
said act of converting said mechanical energy to said electrical energy further comprising receiving said exhaust gases and converting fluid mechanical energy into electrical energy,
said act of receiving said exhaust gases further comprising modifying a flow of said exhaust gases from said combustion engine using a variable nozzle.

24. The method of claim 23 wherein converting mechanical energy to electrical energy comprises converting kinetic energy of a vehicle into electrical energy.

25. The method of claim 23 further comprising:
dissipating said electrical energy as heat; and
controlling flows of said electrical energy among said steps of converting said mechanical energy to said electrical energy, dissipating said electrical energy, and removing said pollutants.

26. The method of claim 23 further comprising:
storing said electrical energy; and
controlling flows of said electrical energy among said steps of converting said mechanical energy to said electrical energy, storing said electrical energy, and removing said pollutants.

27. The method of claim 26 further comprising dissipating said electrical energy as heat, wherein said step of controlling flows of said electrical energy further comprises controlling flows of said electrical energy to said step of dissipating said electrical energy.

28. The method of claim 23 wherein removing pollutants from said exhaust gases comprises:
trapping particles in a particulate trap; and
electrically regenerating said particulate trap.

29. The method of claim 23 wherein removing pollutants from said exhaust gases comprises passing said exhaust gases through a non-thermal plasma converter.

30. A method for reducing emissions of a combustion engine, said method comprising:
converting mechanical energy to electrical energy without mechanically coupling to any drive shaft of said combustion engine;
removing pollutants from exhaust gases of said combustion engine using said electrical energy;
dissipating said electrical energy as heat;
storing said electrical energy; and
controlling flows of said electrical energy among said steps of converting said mechanical energy to said electrical energy, storing said electrical energy, dissipating said electrical energy, and removing said pollutant,
said act of converting said mechanical energy to said electrical energy further comprising receiving said exhaust gases and converting fluid mechanical energy into electrical energy,
said act of receiving said exhaust gases further comprising modifying a flow of said exhaust gases from said combustion engine using a variable nozzle.

31. The method of claim 30 wherein converting mechanical energy to electrical energy comprises converting kinetic energy of a vehicle into electrical energy.

32. The method of claim 30 wherein removing pollutants from said exhaust gases comprises:
trapping particles in a particulate trap; and
electrically regenerating said particulate trap.

33. The method of claim 30 wherein removing pollutants from said exhaust gases comprises passing said exhaust gases through a non-thermal plasma converter.

* * * * *